US012683318B2

(12) United States Patent
Buchholz et al.

(10) Patent No.: US 12,683,318 B2
(45) Date of Patent: Jul. 14, 2026

(54) SCREW FOR A TOUCH-PROOF PLUG CONNECTION

(71) Applicant: TE Connectivity Germany GmbH, Bensheim (DE)

(72) Inventors: Ron Buchholz, Bensheim (DE); Manuel Eheim, Bensheim (DE); Alexander Weber, Bensheim (DE); Marcus Wolf, Bensheim (DE); Bjoern Hoffmann, Bensheim (DE); Patrick Distler, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 510 days.

(21) Appl. No.: 18/296,431

(22) Filed: Apr. 6, 2023

(65) Prior Publication Data

US 2023/0327360 A1 Oct. 12, 2023

(30) Foreign Application Priority Data

Apr. 8, 2022 (DE) ......................... 102022108585.6

(51) Int. Cl.
*H01R 13/44* (2006.01)

(52) U.S. Cl.
CPC .................................... *H01R 13/44* (2013.01)

(58) Field of Classification Search
CPC .......... H01R 13/44; H01R 4/70; H01R 11/26; H01R 4/34; H01R 4/30; F16B 4/004; F16B 21/086; F16B 33/004; F16B 43/00; F16B 2200/93; F16B 35/044; F16B 35/00; F16B 1/02; H01M 50/502
See application file for complete search history.

(56) References Cited

U.S. PATENT DOCUMENTS

| | | | |
|---|---|---|---|
| 5,173,060 | A | 12/1992 | Shimirak et al. |
| 9,281,601 | B2 | 3/2016 | Okayasu et al. |
| 10,205,274 | B2 | 2/2019 | Loncar et al. |

(Continued)

FOREIGN PATENT DOCUMENTS

| | | | |
|---|---|---|---|
| CN | 209200253 | * 8/2019 | ............. H01R 36/00 |
| DE | 102017210425 | * 12/2018 | ............. H01R 13/44 |

(Continued)

OTHER PUBLICATIONS

Korean Office Action dated Sep. 24, 2024 with English translation, corresponding to Application No. 10-2023-0045932, 16 pages.

(Continued)

*Primary Examiner* — Truc T Nguyen
(74) *Attorney, Agent, or Firm* — Barley Snyder

(57) ABSTRACT

A screw for a touch-proof plug connection includes a screw body and a touch protection device. The screw body has a screw head and a screw shank extending from the screw head along a screw-in direction to a screw tip. The screw tip has a connecting element. The touch protection element has a connection device on a coupling side. The connection device is a connection counterpart to the connecting element and connects the touch protection element to the screw body. The touch protection element has an electrically insulating surface on a front side that points in the screw-in direction in a connected state of the screw body and the touch protection element.

14 Claims, 5 Drawing Sheets

(56) References Cited

U.S. PATENT DOCUMENTS

| | | | | |
|---|---|---|---|---|
| 10,381,752 | B2 * | 8/2019 | Kaehny | H01R 11/11 |
| 11,569,604 | B2 * | 1/2023 | Kobayashi | H01R 13/44 |
| 11,705,660 | B2 * | 7/2023 | Reichel | H01R 13/64<br>439/131 |
| 11,962,109 | B2 | 4/2024 | Wolf et al. | |
| 2007/0207652 | A1 * | 9/2007 | Tsuruta | H01R 4/30<br>439/166 |
| 2018/0294600 | A1 * | 10/2018 | Loncar | H01M 50/55 |
| 2021/0320454 | A1 * | 10/2021 | Blakborn | H01R 13/405 |
| 2021/0408721 | A1 | 12/2021 | Wolf et al. | |
| 2022/0085541 | A1 * | 3/2022 | Reichel | H01R 13/621 |
| 2024/0339770 | A1 * | 10/2024 | Baumgartner | H01R 13/44 |
| 2024/0396241 | A1 * | 11/2024 | Peterson | H01R 13/5221 |
| 2025/0202154 | A1 * | 6/2025 | Hemnani | H01R 13/447 |
| 2025/0323456 | A1 * | 10/2025 | Feng | H01R 4/023 |
| 2026/0039054 | A1 * | 2/2026 | Boyer | H01R 13/621 |

FOREIGN PATENT DOCUMENTS

| | | | |
|---|---|---|---|
| DE | 102020100919 | A1 | 7/2021 |
| EP | 3389146 | A1 | 4/2017 |
| EP | 3664225 | A1 | 6/2020 |
| EP | 3869619 | A1 | 8/2021 |
| EP | 3892869 | A1 | 10/2021 |
| JP | 2013093164 | A | 5/2013 |
| JP | 2018200864 | A | 12/2018 |
| JP | 2022013789 | A | 1/2022 |
| WO | 2021213928 | A1 | 10/2021 |

OTHER PUBLICATIONS

European Patent Office Examination Report dated May 28, 2025, corresponding to Application No. 23 167 030.8-1201, 9 pages.
Extended European Search Report dated Aug. 23, 2023, corresponding to Application No. 23167030.8-1201, 10 pages.
Office Action from the German Patent and Trade Mark Office dated Nov. 15, 2022, corresponding to Application No. 10 2022 108 585.6, 4 pages.
Japanese Notice of Reasons for Refusal dated May 7, 2024 with English translation, corresponding to Application No. 2023-061108, 12 pages.
Chinese Office Action dated Jul. 24, 2025 with English translation, corresponding to Application No. 202310362398.2, 13 pages.
Indian Office Action dated Jan. 5, 2026, corresponding to Application No. 202344025236, 8 pages.

* cited by examiner

SCREW FOR A TOUCH-PROOF PLUG CONNECTION

CROSS-REFERENCE TO RELATED APPLICATIONS

This application claims the benefit of the filing date under 35 U.S.C. § 119(a)-(d) of German Patent Application No. 102022108585.6, filed on Apr. 8, 2022.

FIELD OF THE INVENTION

The present invention relates to a screw for a touch-proof plug connection, in particular for an electrical connector. The invention furthermore relates to an electrical connector that comprises an electrically insulating connector housing, a contact element, and a fastening screw. The present invention additionally relates to an electrical plug connection comprising the electrical connector as well as an electrical mating connector.

BACKGROUND

Electrical plug connections with a screw for a screw connection of the connector and the mating connector are known from prior art. The screw connection ensures robust and stable contacting. Such plug connections are used, for example, in the automotive sector, where the plug connections must be resistant to withstand vibrations and high temperatures. Particularly high demands are placed on electrical plug connections that are used in the high-voltage range where they are exposed to high currents and voltages. Such high-voltage connectors are used in the automotive sector, among other things, in electric and/or hybrid vehicles, in order to reliably contact e.g. battery modules of a traction battery as well as other high-voltage connection points outside of the battery. In order to ensure that the plug connections are handled safely during assembly or during inspection or a service, respectively, such plug connections are configured to be touch-proof. The touch-proof nature ensures that a human finger cannot unintentionally contact current-carrying elements so that plug connections of this type can be handled easily and safely.

For example, screwable high-voltage plug connections are known which are configured to be touch-proof with regard to IPxxB according to ISO 20653 which creates a very robust contact that is easy to handle in the typical production environment.

The screws of such plug connections are typically secured against accidental contact both at the screw head and at the screw tip.

However, different geometric framework conditions are given depending on the type of vehicle and battery configuration so that a screw with a specifically adapted geometry has to be manufactured for each application. Different tools are required for screws of different lengths, and the prior art touch-proof screws are designed only for a specific plug connection and cannot be used elsewhere.

SUMMARY

A screw for a touch-proof plug connection includes a screw body and a touch protection device. The screw body has a screw head and a screw shank extending from the screw head along a screw-in direction to a screw tip. The screw tip has a connecting element. The touch protection element has a connection device on a coupling side. The connection device is a connection counterpart to the connecting element and connects the touch protection element to the screw body. The touch protection element has an electrically insulating surface on a front side that points in the screw-in direction in a connected state of the screw body and the touch protection element.

BRIEF DESCRIPTION OF THE DRAWINGS

Exemplary embodiments of the invention are described by way of the following drawings. In the drawings.

DETAILED DESCRIPTION OF THE EMBODIMENT(S)

Figure 1:
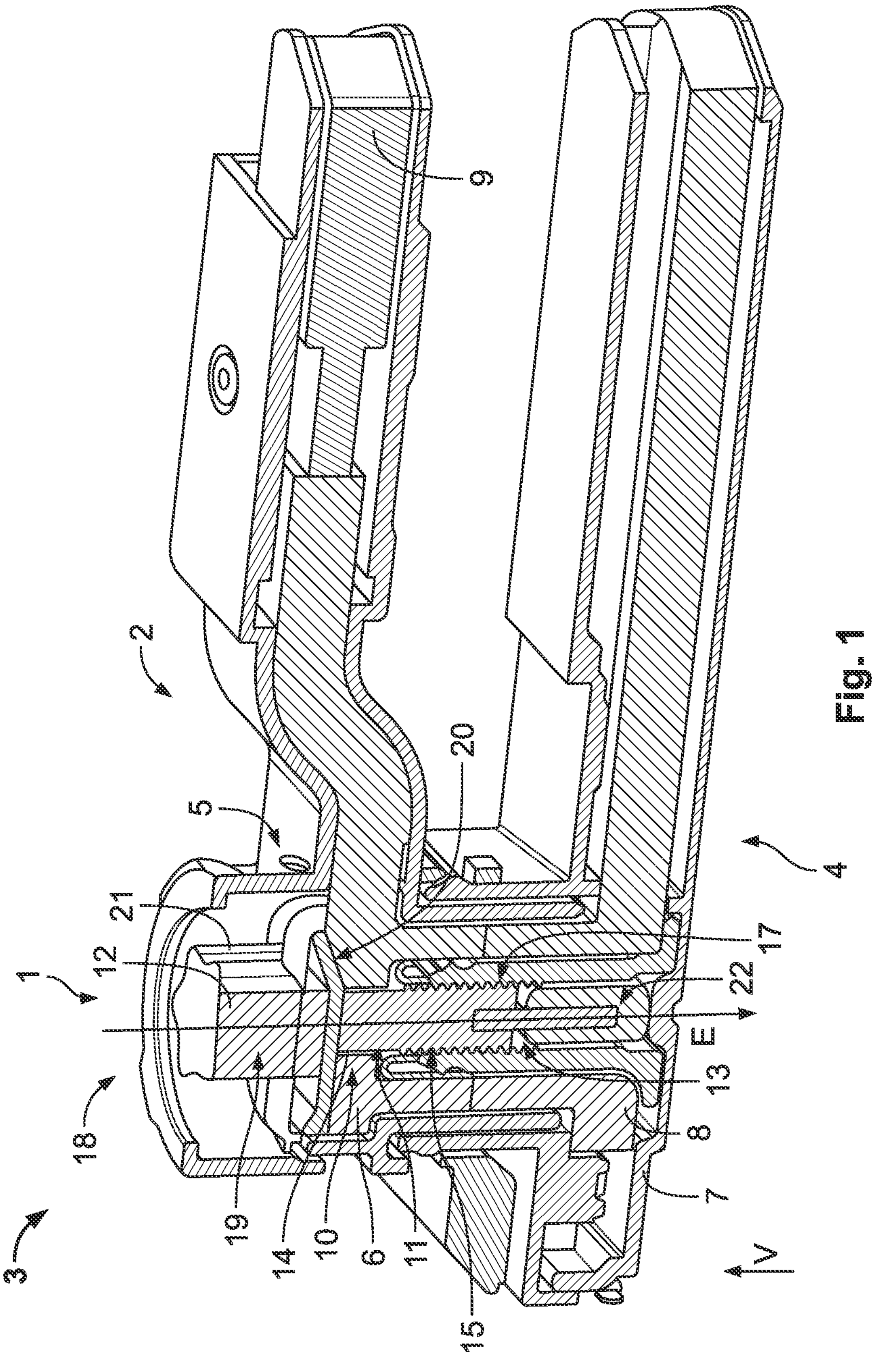
FIG. 1 is a sectional perspective view of an electrical plug connection in a connected state with a connector which comprises a screw of a first embodiment.

The invention shall be described hereafter by way of example using embodiments with reference to the appended figures. Elements in the figures that correspond to one another in terms of structure and/or function are provided with the same reference characters.

The combinations of features shown and described in the individual embodiments are for explanatory purposes only. Features of the embodiments can be omitted if this technical effect associated is of no significance for a particular application. Conversely, a further feature can be added in an embodiment should its technical effect be advantageous for a particular application.

A screw 1 according to the invention in a connector 2 which can be part of a non-contact plug connection 3 shall first be explained with reference to FIGS. 1 and 2, before specific embodiments of screw 1 according to the invention are presented with reference to FIGS. 3 to 6.

FIG. 1 shows an embodiment of a touch-proof plug connection 3 in the connected or closed state, respectively. Electrical plug connection 3 comprises an electrical connector 2 and an electrical mating connector 4. The electrical plug connection 3 may be a high-current and/or high-voltage plug connection. Electrical connector 2 comprises an electrically insulating connector housing 5, a contact element 6, and a screw 1 which can also be referred to as a fastening screw. The specific design of fastening screw 1 shall be discussed in detail later.

Contact element 6 is accommodated in connector housing 5 and is accessible along a connection direction V in which connector 3 is mechanically and electrically connected to its mating connector 4.

Mating connector 4 comprises a mating connector housing 7 in which mating contact element 8 is accommodated. In the connected state of plug connection 3, which is shown in FIG. 1, contact element 6 of connector 3 is connected in an electrically conductive manner to mating contact element 8 of mating connector 4. Contact element 6 can be connected to an electrical conductor 9, for example, a ribbon cable.

Contact element 6 has a passage bore 10 through which screw body 11 of screw 1 penetrates. Screw body 11 comprises a screw head 12 and a screw shank 14 originating from screw head 12 and extending along a screw-in direction E up to a screw tip 13. The screw shank is provided with a screw thread 15, in particular in the region of screw tip 13. Screw tip 13 and the part of screw shank 14 provided with screw thread 15 are arranged on contacting side 16, shown in FIG. 2, of connector housing 5 in the region of contact element 6. Connector 2 can be mechanically connected by way of screw thread 15 to an internal thread 17 of mating connector 4 and can be held in the connected state.

Screw head 12 is accessible from attachment side 18 of connector 3 and is provided with an interface 19 for the engagement of a tool with which fastening screw 1 can be acted upon by a torque. Interface 19 can be, for example, a hexagonal socket, a hexalobe socket, a slot, a Phillips recess or a hexagonal head or, as in the embodiment shown, a hexalobe head or some other standard.

Screw thread 15 can be any thread, where metric ISO threads (DIN 13-1) can be used, for example, a regular thread having a nominal size, e.g. M3, M4, M5, M6 or M8.

In the case of screw body 12, a press-on surface 20 is provided at the transition between screw head 12 and screw shank 14 and points in screw-in direction E and with which the force is transmitted to contact element 6. Press-on surface 20 is formed by the so-called bearing surface of screw head 12.

In order to configure connector 2 to be touch-proof on attachment side 18 as well, screw head 12 is covered with an electrically insulating protective cap 21 so that neither the tool nor a user's finger can come into contact with an electrically conductive area of screw 1 on attachment side 18 when screw 1 is tightened in order to connect connector 2 to mating connector 4 in a mechanical and electrically conductive manner.

Figure 2:
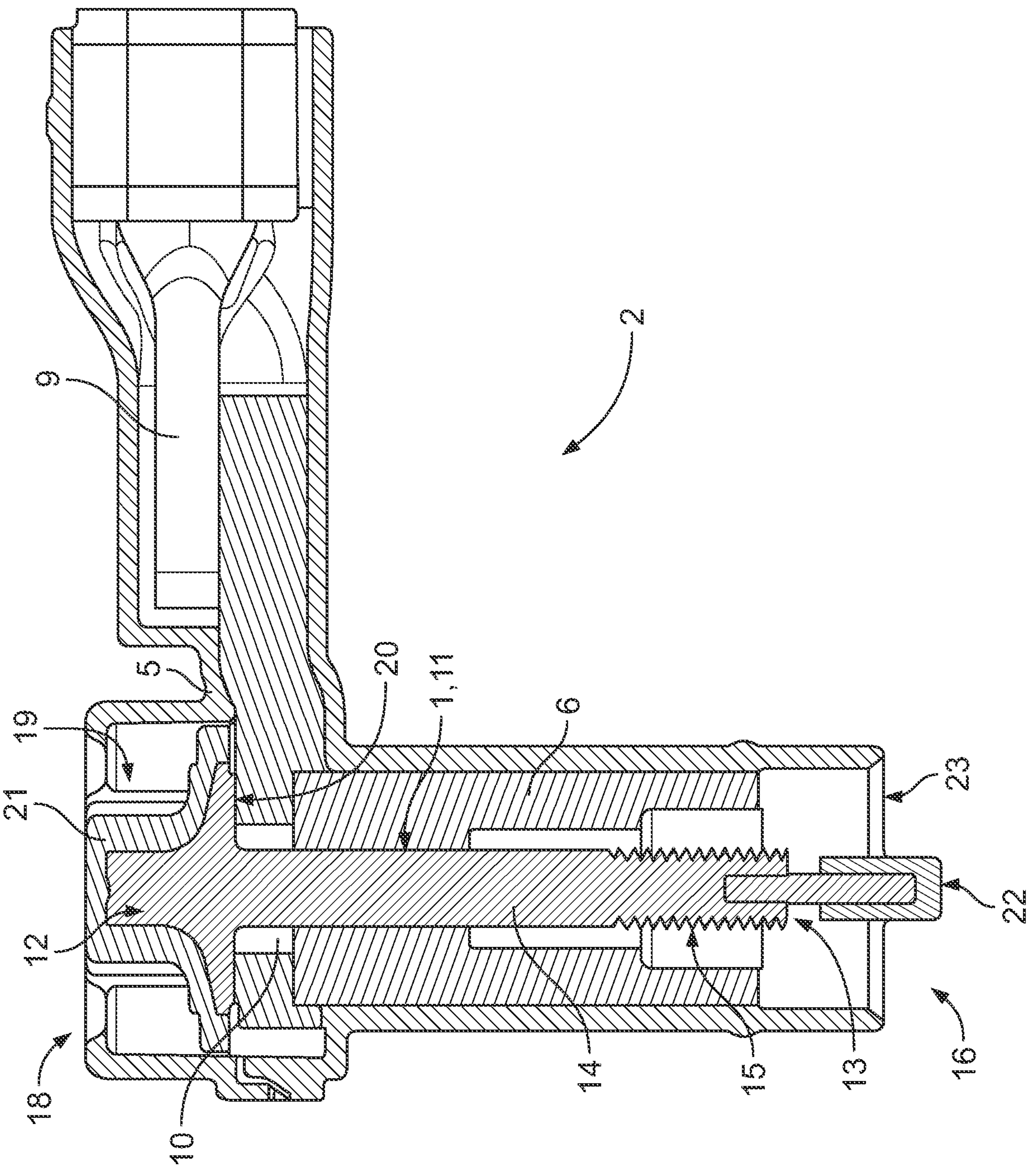
FIG. 2 is a sectional side view of a connector with a screw of a further embodiment.

As can be seen in particular in FIG. 2, not only attachment side 18 but also oppositely disposed contacting side 16 of connector 2 is configured to be touch-proof due to screw 1 according to the invention with its touch protection element 22. Touch protection element 22 is there arranged and aligned on connector 1 in such a way that it excludes access to contact element 6 on contacting side 16 in conjunction with connector housing 5 because it blocks access opening 23, in particular for a human finger.

Figure 3B:
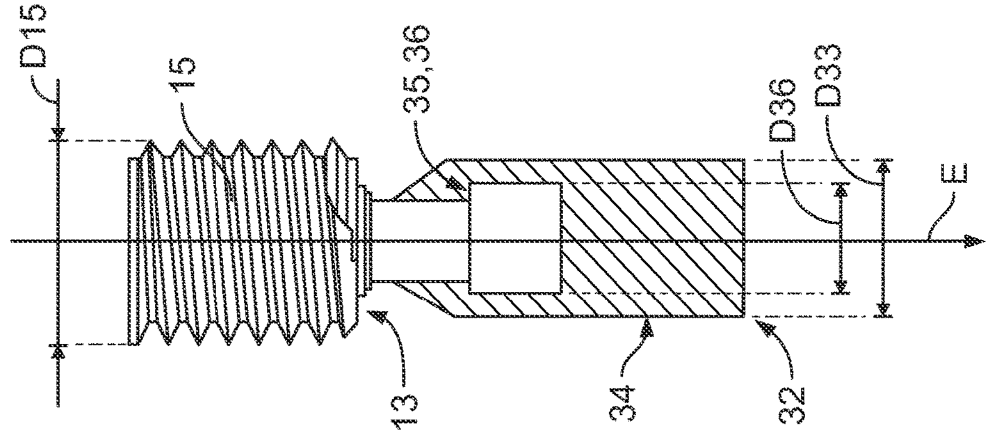
FIG. 3B is a schematic diagram of a detail of the screw of FIG. 3A in the assembled state.
Figure 3A:
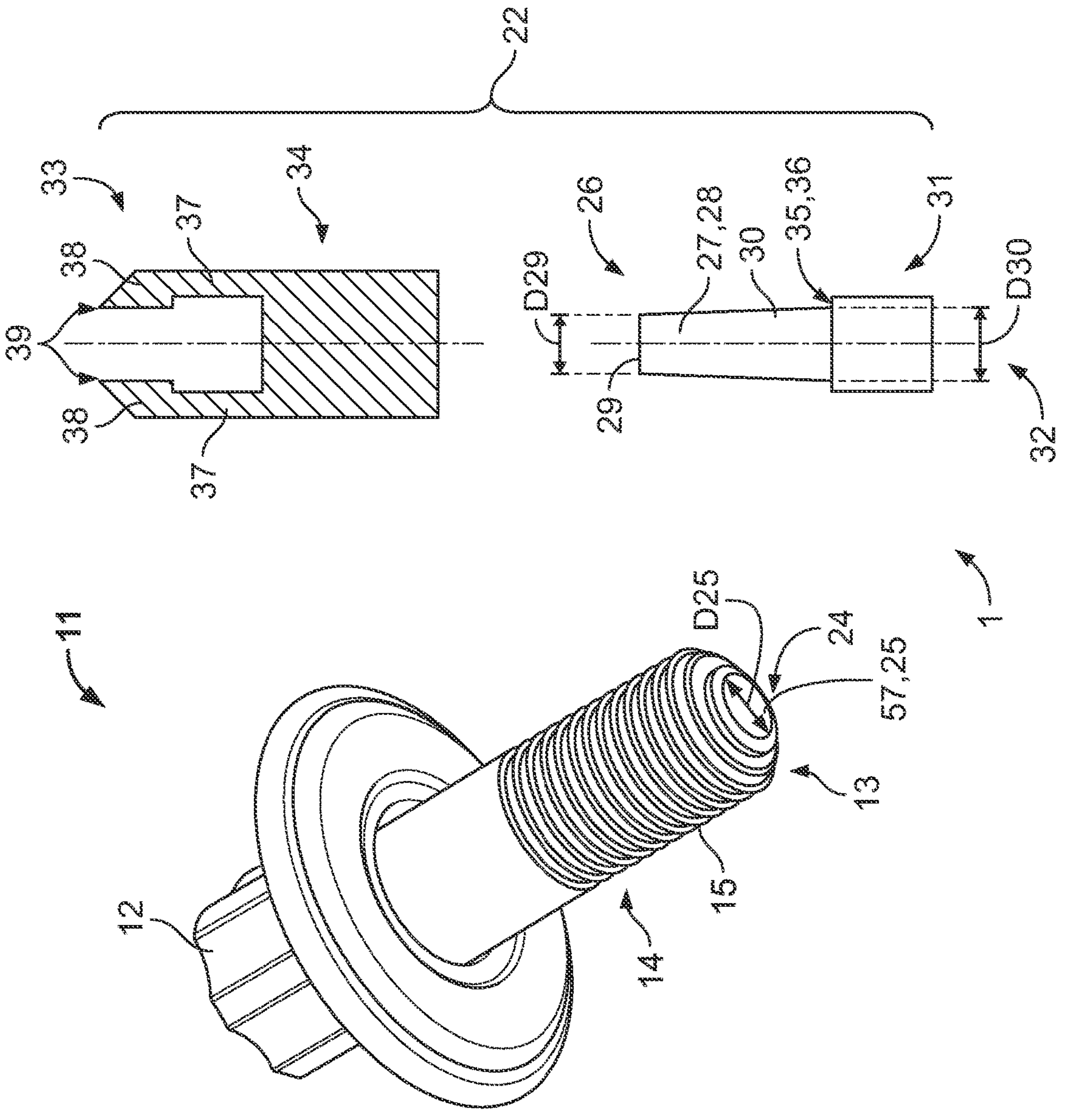
FIG. 3A is a schematic diagram of elements of the fastening screw from FIG. 1 with a screw body illustrated in a schematic perspective view as well as a sectional view of the parts of the touch protection element in the state prior to assembly.

FIGS. 3A and 3B show a first embodiment of a screw 1 according to the invention for a touch-proof plug connection 3 which is comprised, for example, in connector 2 or plug connection 3 of FIG. 1. FIG. 3A shows a screw body 11 in a schematic perspective view. The elements of touch protection element 22 of this embodiment are shown schematically in a longitudinal sectional view. FIG. 3B shows the region of screw shank 14 with screw thread 15 and screw tip 13 in the assembled state, i. e. with touch protection element 22 connected.

A connecting element 24 is formed on screw tip 13. Connecting element 24 can have a cavity 57 for receiving coupling side 26 of touch protection element 22. In the exemplary embodiment of FIG. 3A, connecting element 24 is configured as a blind bore hole 25 which, originating from screw tip 13, extends in a direction opposite to screw-in direction E into the interior of screw shank 14. Blind bore hole 25 has a predetermined blind bore hole diameter D25.

Touch protection element 22 is provided with a connection device 27 on a coupling side 26. Connection device 27 is configured as a complementary connection counterpart to connecting element 24 of screw body 11 for connecting touch protection element 22 to screw body 11. In the embodiment shown, the connection is made as a press connection. Touch protection element 22 has a pressing cone 28 as connection device 27. Pressing cone tip 29 on coupling side 26 has a diameter D29 which is smaller than diameter D25 of blind bore hole 25. Originating from pressing cone tip 29, pressing cone 28 widens up to a transition region 30. In this transition region 30, diameter D30 of pressing cone 28 is larger than diameter D25 of the blind bore hole. Touch protection element 22 can then be pressed with its pressing cone 28 into blind bore hole 25 and can be connected in a force-fit manner to the screw body 11 by this press connection. The force-fit connection can be, for example, a press connection with a press fit or a trilobular fit in which one of the connection counterparts has a trilobular cross section which can be pressed in a frictionally engaging manner into a corresponding opening of the connection counterpart. In another embodiment, one of the connection counterparts can be configured as a Morse taper which enables reliable surface pressure.

Touch protection element 22 is formed not only by touch protection body 31 with pressing cone 28, but also by an insulating element 33 attachable to front side 32 of touch protection body 31 and shown separately in FIG. 3A and in the assembled state in FIG. 3B, i.e. shown attached to touch protection body 31.

Front side 32 of touch protection body 31 is opposite to coupling side 26. In the assembled state, touch protection element 22 of FIG. 3B is connected in screw-in direction E flush to screw shank 14 at screw tip 13. Outer diameter D33 of insulating element 33 is smaller than diameter D15 of screw thread 14 so that connected touch protection element 22 does not impair screw 1 when being screwed in.

In the embodiment shown, insulating element 33 is configured as an insulating cap 34 which, in the assembled state, covers front side 32 and the part of touch protection body 31, in particular its transition region 30, which in the connected state projects from screw tip 13.

In the embodiment shown, insulating cap 34 is connected in a positive-fit manner to touch protection body 31 by way of a latching connection or snap connection, respectively. Touch protection body 31 comprises a latch stop 35 on its front side. For this purpose, front side 32 of touch protection body 31 is configured in the shape of a mushroom head and forms a collar 36 having a collar diameter D36 that is larger than diameter D30 at the transition region and smaller than outer diameter D33 of insulating cap 34. Latch stop 35 formed by collar 36 points substantially in the direction of pressing cone tip 29.

Insulating cap 34 comprises latching arms 37 which can be deflected elastically and which form a snap connection with latch stop 35. Latching arms 37 comprise latching hooks 38 at their distal end which can be brought into engagement with latch stop 35 formed by collar 36 for securing insulating cap 34 in screw-in direction E axially on touch protection body 31, as shown in FIG. 3B. Connected touch protection element 22 is then an electrically insulating surface on front side 32 which in the connected state of screw body 11 and touch protection element 22 points in screw-in direction E and ensures protection against contact. Latching hooks 38 form attachment devices 39 which are configured to connect insulating element 33 to touch protection body 31, in the embodiment in FIGS. 3A and 3B by way of a latching or snap connection.

The connection device 27 of the touch protection element 22 and the connecting element 24 of the screw body 11 can represent complementary connection counterparts that can be joined using common production techniques, i.e. can be connected to one another at a joint. With the connection, the touch protection element 22 can be fixed axially in the screw-in direction E on the screw body 11. The connection can be a stationary connection which prevents both the displacement of the touch protection element 22 in the axial direction along the screw-in direction E relative to the screw body 11 as well as the radial motion perpendicular to the screw-in direction E. Complete fixation, which does not allow for any relative motion of the touch protection element 22 connected to the screw body 11, is also possible.

The connection between the connecting element 24 of the screw body 11 and the connection device 27 of the touch protection element 22 is very simple if the coupling side of the touch protection element 22 is oriented in a direction opposite to the front side 32. Due to the spatial distance of the electrically insulating front side 32 of the touch protection element 22, on the one hand, and the coupling side 26 provided for connection to the connecting element 24, on the other hand, there is a large degree of freedom of configuration both in the shape and sizing of the insulating front side as well as in the configuration of the at least one connection device 27.

The connection counterparts, i.e. the connection device 27 and the connecting element 24, can be configured such that when joined, i.e. in the connected state, the touch protection element 22 is aligned along the screw-in direction E. The touch protection element 22 can be aligned in the screw-in direction E flush with the screw shank 14. The touch protection element 22 can be sized such that, when viewed in the screw-in direction E, it does not protrude laterally beyond the screw shank 14 when in the state connected to the screw body 11. This ensures that the screw 1 according to the invention, in which the touch protection element 22 is connected to the screw body 11, can be screwed in and the touch protection element 22 does not impair the screw connection between the screw 1 and its mating thread.

In an embodiment, the connecting element 24 and the connection device 27 can be parts of a releasable connection. The touch protection element 22 can then be releasable connected to the screw body 11. This is advantageous for maintenance purposes and allows for an element of the screw 1 according to the invention, for example the screw body 11, to be reused in a different application environment. Connection counterparts of a positive-fit and/or force-fit connection, for example, screw connections or latchings, are suitable as releasable connection counterparts.

Figure 4:
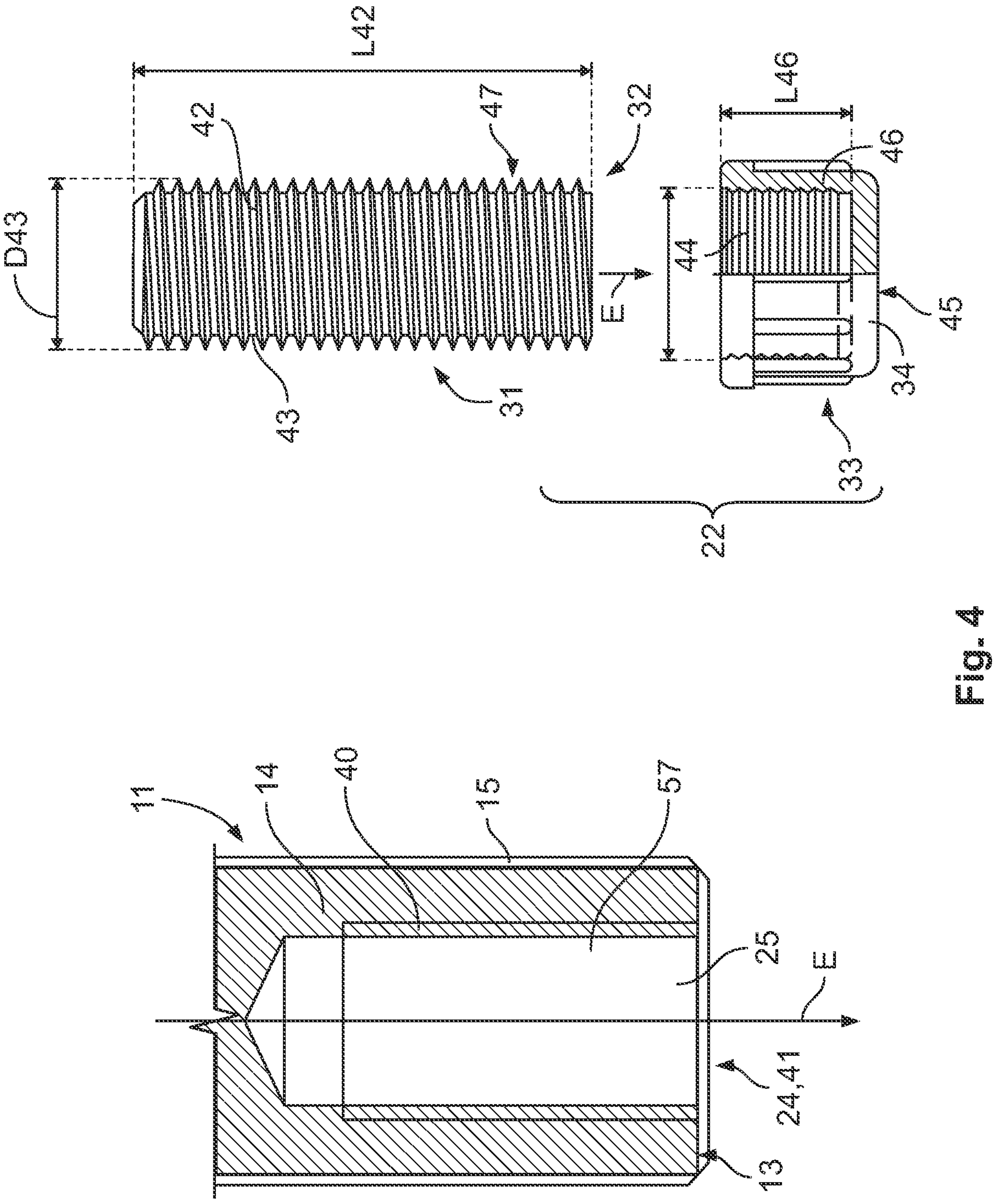
FIG. 4 is a partially sectional side view of a detail of a fastening screw according to a further embodiment.

A further embodiment of a screw 1 according to the invention is illustrated hereafter with reference to FIG. 4. FIG. 4 shows only the front part of screw shank 14 with screw tip 13 and connecting element 24 in a schematic illustration in a longitudinal sectional view. Touch protection body 31 of touch protection element 22 is shown as a schematic side view and insulating element 33 partially in section in FIG. 4 in a schematic side view. Only the differences between this embodiment of the screw according to the invention in comparison to the previous embodiment of FIGS. 3A and 3B shall be discussed in more detail hereafter.

In the embodiment of FIG. 4, screw shank 14 is also configured with a cavity 57 at its screw tip 13. Connecting element 24 is likewise of the blind bore hole 25 type. In contrast to the previous embodiment, blind bore hole 25 of connecting element 24 in FIG. 4 is provided with an internal thread 40 as connecting element 24. Specifically, connecting element 24 in FIG. 4 is configured as a blind bore hole thread 41 which enables a screw connection and thereby a positive-fit and force-fit connection between touch protection element 22 and screw body 11. In other embodiments, the touch protection element 22 can be connected to the screw body 11 by a frictionally engaged and/or adhesive bond/positive substance-fit connection. Configurations in which the connecting element 24 is formed on the screw tip 13, for example, in that a projection with the connecting element 24 is present on the screw tip 13, are also conceivable. This projection can protrude from the screw tip 13 in the screw-in direction E.

Touch protection body 31 is configured as a threaded rod 42 in the embodiment of FIG. 4. Diameter D43 of rod thread 43 corresponds to internal thread 40 of blind bore hole thread 41 so that threaded rod 42 can be screwed into blind bore hole thread 41 Touch protection element 22 can be connected by way of rod thread 43 as a connection device 27 in a simple and structurally secure manner to connecting element 42 of screw body 11, namely to internal thread 40 of blind bore hole thread 41.

For the electrical insulation of front side 32 of threaded rod 42, an insulating element 33 is provided which is configured as an insulating cap 34. In contrast to the embodiment in FIG. 3, insulating cap 34 of this embodiment comprises a cap thread 44 with which insulating cap 34 can be screwed onto front side 32 of threaded rod 42. The insulating cap 34 can be configured to cover at least the front side 32 of the touch protection body 22. The insulating body can be configured, in particular, to cover in an electrically insulating manner not only the front side 32 but also the flanks of the touch protection body 31 adjoining the front side 32.

The insulating element 33 can be connected in a positive-fit and/or force-fit manner to the touch protection body 22. The insulating element 33 can be releasably connected to the touch protection body 22, for example, screwed or latched thereto. The options described herein with regard to the connection between the connecting element 42 of the screw body 11 and the connection device 27 of the touch protection element 22 can be considered, among other things, as joining elements for producing the connection between the insulating element 33 and the touch protection element 22. The insulating element 33 can there be provided with an attachment device which is configured to connect the insulating element 33 to the touch protection body 22. The attachment device can be, for example, a latching hook, a thread, or an element of a press fit.

The embodiment of FIG. 4 can be used modularly and flexibly, but is also inexpensive to produce, especially when standard threaded rods are used. The overall length of screw 11 and in particular of the region of touch protection element 22 can be precisely adjusted in a structurally simple manner by way of length L42. Insulating cap 34 is pot-shaped, where cap base 45 in the assembled state rests against front side 32 of threaded rod 42 and insulates it electrically. Lateral cap wall 46 covers lateral flanks 47 of threaded rod 42 on its front side 32 and insulates these regions. By choosing cap length L46, it can be determined in a simple manner over which length of threaded rod 42 its flanks 47 are to be insulated.

The touch protection element 22 can comprise a complementary connecting element in the form of a coupling side with an external thread which can be connected to such a connecting element 42 in a positive-fit and force-fit manner. Such a screw connection offers a robust, reliable, yet repeatedly releasable connection option between the contact element 6 and the screw body 11.

The modular structure of screw 1 according to the embodiment from FIG. 4 allows for many different possible uses and allows for screw 1 to be reused, even in other environments. For this purpose, for example, only threaded rod 42 or insulating cap 34 would have to be exchanged and adapted to the changed geometry of new plug connection 3. This embodiment is also advantageous with regard to maintenance and repairs.

Figure 5:
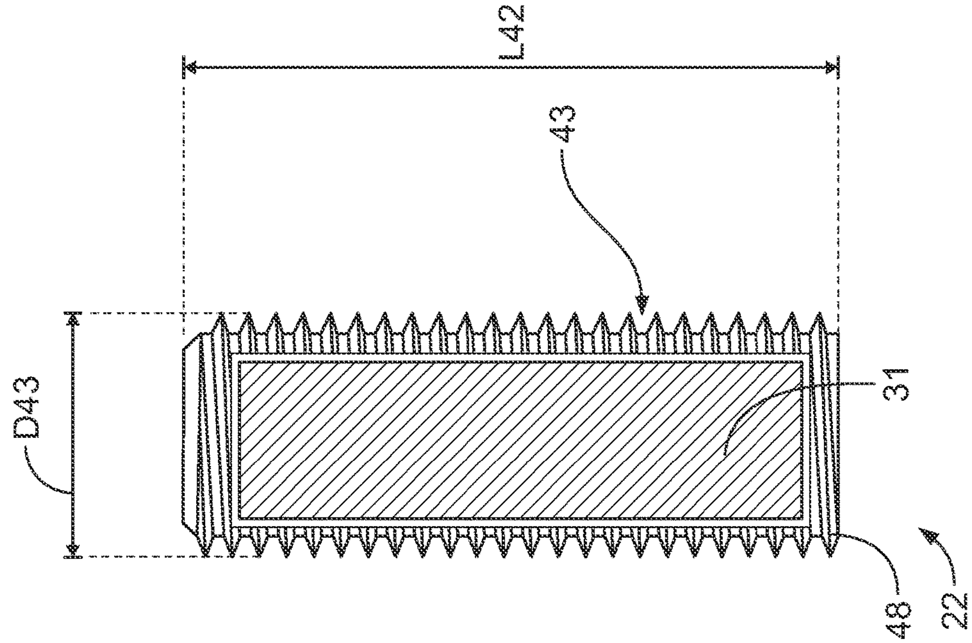
FIG. 5 is a schematic view of a touch protection element according to a further embodiment.

A further embodiment of a touch protection element 22 is shown in FIG. 5. This embodiment comprises a touch protection element 22 with a rod-shaped touch protection body 31, which can be made, for example, from metal, which results in good strength. Touch protection body 31 is surrounded on all sides by a coating 48. Coating 48 is made from electrically insulating material and ensures that touch protection element 22 of this embodiment warrants the required touch-proof nature.

The touch protection body 22 can be optimized in terms of its material properties, for example, with regard to possible impedances. The main function, namely touch protection, is ensured by the front side that is covered with the electrical material. In this embodiment, the touch protection body 22 can be configured independently of the electrically insulating material as long as a front side is coated with an electrically insulating material. In order to cover the front side with an electrically insulating material, this front side can either be coated with an electrically insulating material or have it be cast over, for example, in an injection molding process. The front side can also be covered by a separate insulating element, which shall be discussed in more detail hereafter. A particularly secure connection and good heat dissipation as well as influence of the impedance can be obtained when the touch protection body 22 is made from metal.

The touch protection body 22 can also be made of an electrically insulating material, e.g. be formed monolithically from the electrically insulating material, which also enables particularly effective touch protection in the region of the screw tip 13.

In the embodiment shown, the coating is formed with a rod thread 43 so that touch protection element 22 in the embodiment of FIG. 5 assumes the shape of a threaded rod 42 that is electrically insulating toward the outside. An insulating cap 34 can be dispensed with in this embodiment. Insulating element 33 of FIG. 5 is therefore electrically insulating coating 48. Coating 48 can be formed directly as a rod thread 43 around touch protection body 31, for example, in an injection molding process. It is also possible to first coat touch protection body 31 with coating 48 and to then form rod thread 43 into the coating.

Figure 6:
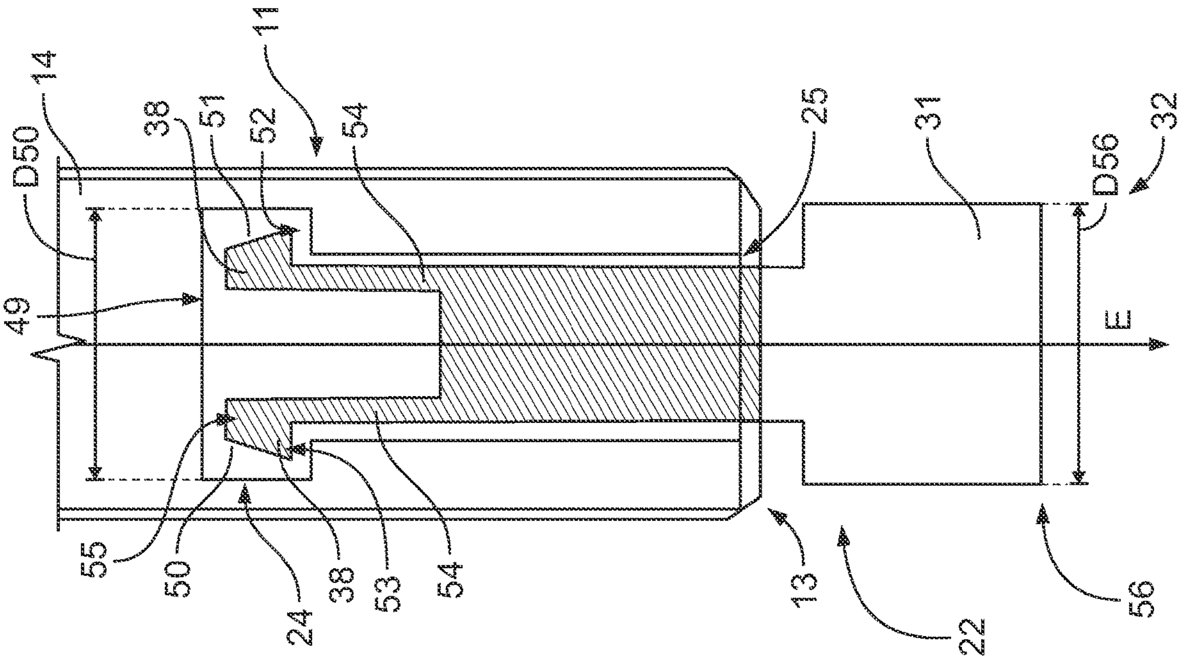
FIG. 6 is a detail of a further embodiment of the fastening screw in a schematic sectional view.

Finally, a further embodiment of a screw 1 according to the invention shall also be discussed with reference to FIG. 6. In FIG. 6, front region 32 of screw body 11 with touch protection element 22 attached is shown schematically in a longitudinal sectional view.

Provided at screw tip 13 is again a blind bore hole 25 which, originating from screw tip 13, is formed into screw shank 14 in a direction opposite to screw-in direction E.

In this embodiment, a positive-fit connecting element 24 in the form of a latching device 58 is configured as connecting element 24. For this purpose, an undercut in the form of a projection 50, in which the diameter of blind bore hole 25 expands to a projection diameter D50, is provided at blind hole 49, i.e. the part of blind bore hole 25 which is disposed opposite the opening at screw tip 13. Due to projection 50, a circumferential groove 51 arises at blind hole 49 and provides a connecting shoulder 52 pointing in a direction opposite to screw-in direction E.

Connecting surfaces 53 of touch protection element 22 can be made to engage in a positive-fit manner with this connecting shoulder 52 in order to attach touch protection element 22 to connecting element 24.

Of course, the complementary connection counterparts, the connecting element 24 of the screw body 11, and the connection device 27 of the touch protection element 22 can always be configured the other way around, even if this is not explicitly described in the present description. For example, the touch protection element 22 could therefore also have a latch stop, for example, a back taper, in which a connecting element 24 of the screw body 11 configured as a latching hook 38 can engage and form a snap connection.

Touch protection body 31 of touch protection element 22 is substantially cylindrical having dimensions that are complementary to diameter D25 of blind bore hole 25. Arranged on coupling side 26 of touch protection body 31 are elastically configurable connecting arms 54 as connection device 27. Connecting arms 54 extend away from touch protection body 31 substantially parallel to the longitudinal axis of touch protection body 31 which in the assembled state coincides with screw-in direction E. Latching hooks 38 are arranged at distal end 55 of connecting arms 54.

Touch protection element 22 of FIG. 6 can be easily connected to screw body 11 by being inserted with latching hooks 38 first into blind bore hole 25. In doing so, connecting arms 54 are deflected inwardly towards one another until they lie in projection 50 shaped as a groove 51, where they spring back to their resting state. Connecting surfaces 53 of latching hooks 38 come into engagement with connecting shoulder 52 of groove 51 and touch protection element 22 is secured on screw body 11 in a positive-fit manner.

Touch protection body 51 of FIG. 6 comprises a touch protection head 56 on its front side 32. Diameter D56 is widened in this region for achieving a better touch protection effect. However, diameter D56 of the touch protection head is smaller than diameter D15 of the screw thread.

Touch protection element 22 in the exemplary embodiment shown in FIG. 6 is monolithic, i.e. manufactured integrally from plastic material, and can be produced, for example, by way of an injection molding process. This allows for cost-effective production of large quantities and implements both the electrically insulating properties as well as the formation of the elastically deformable connecting arms 54 with the connecting hooks.

The present invention provides a screw 1 for a touch-proof plug connection that can be used flexibly and at the same time is robust, safe, and easy to handle.

The touch-proof screw 1 according to the invention has the advantage that its two-part structure consisting of a screw body 11 and a touch protection element 22 that can be connected to the screw body 11 provides a flexible system in which substantially standardized screws can be used that only need to be provided with a connecting element 24 at their screw tip 13. The adaptation to different geometries of connectors or plug connections, respectively, as used in different vehicles, can be implemented in the touch protection element 22 independently of the screw 1. In addition, the screw body 11 can also be used as a screw 1 without the touch protection element 22. The screw 1 is robust and easy to manufacture due to the connection counterpart, by way of which the touch protection element 22 can be connected to the screw body 11. Due to the two-part design, the screw 1 offers great variation possibilities and a high degree of flexibility at the same time.

What is claimed is:

1. A screw for a touch-proof plug connection, comprising:

a screw body having a screw head and a screw shank extending from the screw head along a screw-in direction to a screw tip, the screw tip has a connecting element; and a touch protection element having a connection device on a coupling side, the connection device is a connection counterpart to the connecting element and connects the touch protection element to the screw body, the touch protection element has an electrically insulating surface on a front side that points in the screw-in direction in a connected state of the screw body and the touch protection element in which the screw body and the touch protection element are separated from a mating connector that is matable with the screw body along the screw-in direction, the touch protection element has a touch protection body and an insulating element that is attachable to the front side of the touch protection body.

2. The screw of claim 1, wherein the touch protection element is connected to the screw body by a positive-fit, frictionally engaged, and/or adhesive bond between the connection device and the connecting element.

3. The screw of claim 1, wherein the touch protection element is releasably connected to the screw body.

4. The screw of claim 1, wherein the touch protection element does not protrude beyond the screw shank when connected to the screw body.

5. The screw of claim 1, wherein the screw tip has a cavity receiving the coupling side of the touch protection element.

6. The screw of claim 1, wherein the connecting element has a thread or a latching device.

7. The screw of claim 5, wherein the cavity has an internal thread.

8. The screw of claim 1, wherein the touch protection element is made from an electrically insulating material.

9. The screw of claim 1, wherein the touch protection body is coated with an electrically insulating material at least on the front side.

10. The screw of claim 9, wherein the touch protection body is covered on all sides by the electrically insulating material.

11. The screw of claim 1, wherein the insulating element has an attachment device connecting the insulating element to the touch protection body.

12. The screw of claim 11, wherein the insulating element is connected to the touch protection body in a positive-fit and/or force-fit manner.

13. The screw of claim 1, wherein the insulating element is an insulating cap.

14. The screw of claim 9, wherein the touch protection body is made from metal.

* * * * *